United States Patent
Yoshioka et al.

(10) Patent No.: US 9,046,020 B2
(45) Date of Patent: Jun. 2, 2015

(54) ELECTRICALLY HEATED CATALYST

(75) Inventors: Mamoru Yoshioka, Susono (JP); Takashi Watanabe, Gotennba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 182 days.

(21) Appl. No.: 13/821,809

(22) PCT Filed: Sep. 8, 2010

(86) PCT No.: PCT/JP2010/065439
§ 371 (c)(1),
(2), (4) Date: Mar. 8, 2013

(87) PCT Pub. No.: WO2012/032625
PCT Pub. Date: Mar. 15, 2012

(65) Prior Publication Data
US 2013/0167514 A1    Jul. 4, 2013

(51) Int. Cl.
*B01D 50/00* (2006.01)
*F01N 3/20* (2006.01)

(52) U.S. Cl.
CPC ............ *F01N 3/2013* (2013.01); *F01N 3/2026* (2013.01); *Y02T 10/26* (2013.01)

(58) Field of Classification Search
CPC ....... F01N 3/2013; F01N 3/2026; F01N 3/20; Y02T 10/26

USPC .................................. 422/174, 177, 179, 180
See application file for complete search history.

(56) References Cited

U.S. PATENT DOCUMENTS 5,744,104 A    4/1998  Sakurai et al.

FOREIGN PATENT DOCUMENTS

| JP | 5 269387 | 10/1993 |
|----|----------|---------|
| JP | 5-96421 U | 12/1993 |
| JP | 5 96423 | 12/1993 |
| JP | 7-238825 A | 9/1995 |
| JP | 2004 100637 | 4/2004 |

OTHER PUBLICATIONS

International Search Report Issued Dec. 7, 2010 in PCT/JP10/65439 Filed Sep. 8, 2010.
Office Action issued Jul. 9, 2013 in Japanese Application No. 2012-532779.

*Primary Examiner* — Tom P Duong
(74) *Attorney, Agent, or Firm* — Oblon, McClelland, Maier & Neustadt, L.L.P.

(57) ABSTRACT

In an electrically heated catalyst, an electrode is connected to a heat generating element while passing through a through-hole which is formed through a case and an electrode chamber which is formed between an inner wall surface of the case and an outer circumferential surface of the heat generating element. Further, a support member, which is formed of an electric insulator material and which supports the electrode in the through-hole formed through the case, extends along the electrode to the inside of the electrode chamber.

4 Claims, 6 Drawing Sheets

UPSTREAM SIDE

DOWNSTREAM SIDE

ELECTRICALLY HEATED CATALYST

TECHNICAL FIELD

The present invention relates to an electrically heated catalyst provided for an exhaust gas passage of an internal combustion engine.

BACKGROUND ART

Conventionally, an electrically heated catalyst or electric heating catalyst (hereinafter referred to as "EHC"), in which a catalyst is heated by a heat generating element that generates the heat by applying the electricity, has been developed as an exhaust gas purification catalyst provided for an exhaust gas passage of an internal combustion engine.

In EHC, an insulating member, which provides insulation from electricity, is provided between the heat generating element which generates the heat by applying the electricity and a case which accommodates the heat generating element. For example, Patent Document 1 discloses such a technique for EHC that a mat composed of an insulator or insulating material is provided between a carrier which generates the heat by applying the electricity and a case which accommodates the carrier. The provision of the insulating member as described above makes it possible to suppress any short circuit formation between the heat generating element and the case.

Patent Document 2 discloses a technique concerning a position of installation of a temperature sensor in order to preferably perform the temperature management for a filter and a heater in relation to such an arrangement that an exhaust tube of an internal combustion engine is provided with the filter which collects particulates contained in an exhaust gas and the heater which heats the filter in order to regenerate the filter. Patent Document 2 describes the fact that if a temperature detecting unit of the temperature sensor is installed in the vicinity of the heater, the temperature detection value of the temperature sensor is hardly lowered even when the heater is turned OFF.

Preceding Technical Documents

Patent Documents

Patent Document 1: JP05-269387A;
Patent Document 2: JP2004-100637.

SUMMARY OF THE INVENTION

Task to be Solved by the Invention

An electrode chamber, which is a space for allowing an electrode to pass therethrough so that the electrode is connected to the heat generating element, is formed in the case for the heat generating element of EHC. The insulating member and the heat generating element constitute the wall surfaces of the electrode chamber.

The exhaust gas, which flows through an exhaust tube, invades the insulating member and the heat generating element. The exhaust gas, which has passed through the insulating member or the outer circumferential wall of the heat generating element, invades the inside of the electrode chamber formed as described above. The moisture content (water content or water) is contained in the exhaust gas. Therefore, when the exhaust gas invades the inside of the electrode chamber, any condensed water appears in some cases in the electrode chamber on account of the condensation of moisture content contained in the exhaust gas.

Further, any condensed water also appears in the exhaust tube in some cases on account of the condensation of moisture content (water) contained in the exhaust gas on the wall surface of the exhaust tube. When the condensed water appears in the exhaust tube, the condensed water flows along the inner wall surface of the exhaust tube by being pushed by the exhaust gas. When the condensed water arrives at EHC, the condensed water invades the insulating member and the heat generating element. When the condensed water invades the insulating member and the heat generating element, the condensed water which has passed therethrough as well as the water vapor which is produced therein by the evaporation of the condensed water invades the inside of the electrode chamber in some cases.

The electrode chamber is the space which is surrounded, for example, by the heat generating element and the insulating member in the case. Therefore, the condensed water or the water vapor, which is produced in the electrode chamber or which invades the inside of the electrode chamber, tends to stay in the electrode chamber. If the inner wall surface of the electrode chamber and the electrode are covered with the condensed water, it is feared that any short circuit may be formed between the electrode and the case. If the short circuit is formed between the electrode and the case, it is difficult to sufficiently raise the temperature of the heat generating element by applying the electricity. As a result, it is feared that the ability of EHC to purify the exhaust gas may be lowered.

The present invention has been made taking the foregoing problem into consideration, an object of which is to suppress any short circuit between an electrode and a case in EHC.

Solution for the Task

In EHC according to the present invention, an electrode is connected to a heat generating element while passing through a through-hole which is formed through a case and an electrode chamber which is formed between an inner wall surface of the case and an outer circumferential surface of the heat generating element. Further, a support member, which is formed of an electric insulator material and which supports the electrode in the through-hole formed through the case, extends to the inside of the electrode chamber along the electrode.

In particular, EHC according to the present invention resides in an electrically heated catalyst provided in an exhaust gas passage of an internal combustion engine, the electrically heated catalyst comprising:

a heat generating element which generates heat by applying electricity and which heats a catalyst by generating the heat;

a case which accommodates the heat generating element;

an insulating member which is provided between the heat generating element and the case, which supports the heat generating element, and which provides insulation from electricity;

an electrode which is connected to the heat generating element while passing through a through-hole formed through the case and an electrode chamber and which supplies electricity to the heat generating element, the electrode chamber being a space positioned between an inner wall surface of the case and an outer circumferential surface of the heat generating element and the electrode chamber having a wall surface formed by the insulating member; and a support member which is formed of an electric insulator material, which supports the electrode by being provided between the case and the electrode without any gap in the through-hole formed through the case, and which is formed to protrude into the electrode chamber along the electrode, wherein:

a portion of the case, which forms a wall surface of the electrode chamber and at which the through-hole is formed, is formed to have a protruding shape which protrudes outwardly as compared with any other portion, and an inner wall surface of the protruding shape portion is separated from the support member.

In EHC according to the present invention, a portion of the case, which forms a wall surface of the electrode chamber and at which the through-hole is formed for allowing the electrode to pass therethrough, is formed to have a protruding shape which protrudes outwardly as compared with any other portion. Further, the inner wall surface disposed inside the protruding shape portion is separated from the support member. Accordingly, the electrode chamber is more widened or expanded outwardly. Therefore, the portion of the support member, which protrudes to the inside of the electrode chamber along the electrode, can be more lengthened. Therefore, the creeping distance, which is provided to effect the insulation between the electrode and the case, can be more lengthened.

In the case of the foregoing arrangement, the support member may be formed such that a portion of the support member, which protrudes into the electrode chamber along the electrode, has a forward end which is positioned outwardly as compared with an inner wall surface of the other portion of the case in the portion of the case which is formed to have the protruding shape. Accordingly, the support member is hardly directly exposed to the flow of the exhaust gas which passes through the insulating member and which invades the inside of the electrode chamber. Therefore, the support member is hardly covered with the condensed water.

In the present invention, the support member may be formed such that a portion of the support member, which protrudes into the electrode chamber, has cross-sectional areas which are provided in a direction perpendicularly intersecting an axial direction of the electrode and which are more decreased at portions disposed nearer to the heat generating element as compared with portions disposed nearer to the inner wall surface of the case.

Accordingly, the heat capacity is more decreased at the portions of the support member disposed nearer to the heat generating element. As a result, the evaporation is more accelerated for the condensed water which covers the concerning portions of the support member. Therefore, any short circuit between the electrode and the case can be suppressed at a higher probability.

Effect of the Invention

According to the present invention, it is possible to suppress any short circuit between the electrode and the case in EHC.

MODE FOR CARRYING OUT THE INVENTION

A specified embodiment of the present invention will be explained below on the basis of the drawings. For example, the size (dimension), the material, the shape, and the relative arrangement of any constitutive part or component described in the embodiment of the present invention are not intended to limit the technical scope of the invention only thereto, unless otherwise specifically noted.

<First Embodiment>
[Schematic Arrangement of EHC]

Figure 1:
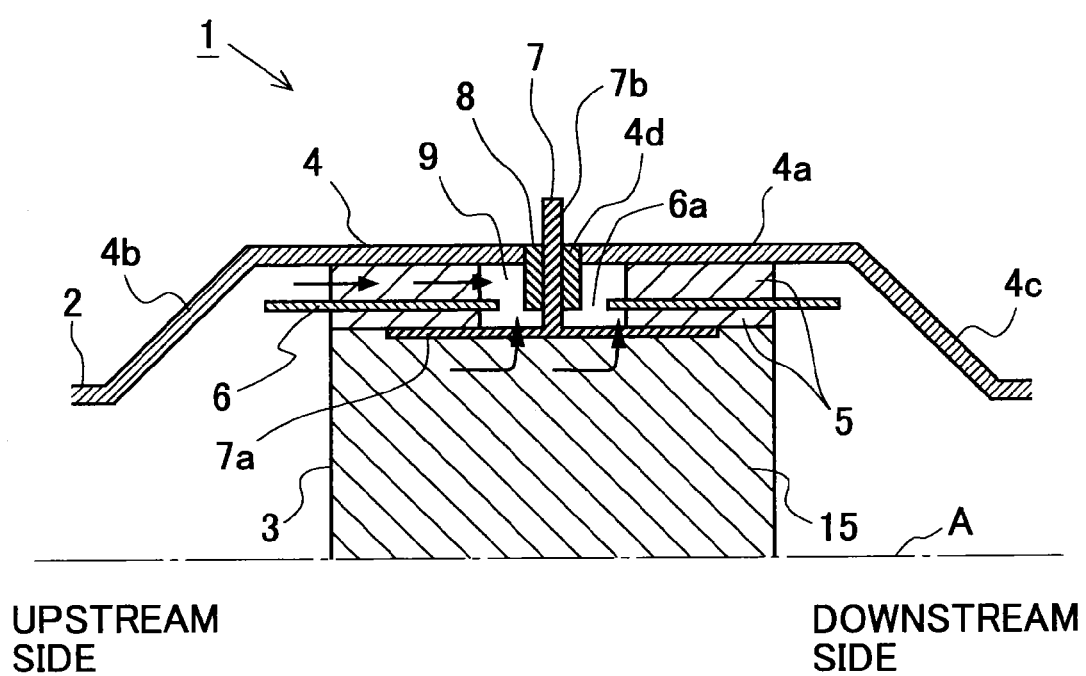
FIG. 1 shows a schematic arrangement of EHC according to a first embodiment.

FIG. 1 shows a schematic arrangement of an electrically heated catalyst (EHC) according to this embodiment. EHC 1 according to this embodiment is provided for an exhaust tube of an internal combustion engine carried on a vehicle. The internal combustion engine may be either a diesel engine or a gasoline engine. EHC 1 according to this embodiment can be also used for a vehicle which adopts the hybrid system provided with an electric motor.

FIG. 1 shows a cross-sectional view in which EHC 1 is cut or sectioned in the vertical direction along the central axis A of the exhaust tube 2 of the internal combustion engine. The shape of EHC 1 is linearly symmetric in relation to the central axis A. Therefore, only an upper part of EHC 1 is shown in FIG. 1 for the purpose of convenience.

EHC 1 according to this embodiment is provided with a catalyst carrier 3, a case 4, a mat 5, an inner tube 6, and electrodes 7. The catalyst carrier 3 is formed to have a columnar shape, and the catalyst carrier 3 is installed so that the central axis thereof is coaxial with the central axis A of the exhaust tube 2. An exhaust gas purification catalyst 15 is carried on the catalyst carrier 3. The exhaust gas purification catalyst 15 can be exemplified, for example, by an oxidation catalyst, an absorption reduction type NOx catalyst, a selective reduction type NOx catalyst, and a three way catalyst.

The catalyst carrier 3 is formed of a material which behaves as an electric resistor to generate the heat when the electricity is applied. SiC can be exemplified as the material for the catalyst carrier 3. The catalyst carrier 3 has a plurality of passages which extend in the direction of the flow of the exhaust gas (i.e., in the direction of the central axis A) and which provide a honeycomb shape formed in a cross section perpendicular to the direction of the flow of the exhaust gas. The exhaust gas flows through the passages. The cross-sectional shape of the catalyst carrier 3, which is provided in relation to the direction perpendicular to the central axis A, may be, for example, an elliptic shape. The central axis A is the common central axis which is common to the exhaust tube 2, the catalyst carrier 3, the inner tube 6, and the case 4.

The catalyst carrier 3 is accommodated in the case 4. An electrode chamber 9 is formed in the case 4. A pair of electrodes 7 (only one electrode is shown in FIG. 1) are connected to the catalyst carrier 3 while passing through the electrode chamber 9. The electricity is supplied to the electrode 7 from a battery (not shown). When the electricity is supplied to the electrode 7, the electricity is applied to the catalyst carrier 3. When the catalyst carrier 3 generates the heat by applying the electricity, then the exhaust gas purification catalyst 15, which is carried on the catalyst carrier 3, is heated, and the activation thereof is accelerated.

The case 4 is made of metal. The material for forming the case 4 can be exemplified by a stainless steel material. The case 4 has an accommodating portion 4a which is constructed to include a curved surface parallel to the central axis A, and tapered portions 4b, 4c which connect the accommodating portion 4a and the exhaust tube 2 on the upstream side and the downstream side from the accommodating portion 4a. The cross-sectional area of the passage of the accommodating portion 4a is larger than the cross-sectional area of the passage of the exhaust tube 2. The catalyst carrier 3, the mat 5, and the inner tube 6 are accommodated at the inside of the accommodating portion 4a. Each of the tapered portions 4b, 4c has such a tapered shape that the cross-sectional area of the passage is reduced at positions separated farther from the accommodating portion 4a.

The mat 5 is interposed between the inner wall surface of the accommodating portion 4a of the case 4 and the outer circumferential surface of the catalyst carrier 3. In other words, the catalyst carrier 3 is supported by the mat 5 in the case 4. Further, the inner tube 6 is interposed in the mat 5. In other words, the mat 5 is divided by the inner tube 6 into a portion disposed on the side of the case 4 and a portion disposed on the side of the catalyst carrier 3.

The mat 5 is formed of an electric insulator material. A ceramic fiber, which contains alumina as a main component, can be exemplified as the material for forming the mat 5. The mat 5 is wound around the outer circumferential surface of the catalyst carrier 3 and the outer circumferential surface of the inner tube 6. Owing to the fact that the mat 5 is interposed between the catalyst carrier 3 and the case 4, the electricity is suppressed from flowing to the case 4 when the electricity is applied to the catalyst carrier 3.

The inner tube 6 is formed of an electric insulator material. Alumina can be exemplified as the material for forming the inner tube 6. The inner tube 6 is formed to have a tubular shape about the center of the central axis A. As shown in FIG. 1, the length of the inner tube 6, which is provided in the direction of the central axis A, is longer than that of the mat 5. Therefore, the end portions of the inner tube 6, which are disposed on the upstream side and the downstream side, protrude from the end surfaces of the mat 5 which are disposed on the upstream side and the downstream side.

Through-holes 4d, 6a are bored through the case 4 and the inner tube 6 in order to allow the electrode 7 to pass therethrough. A space is formed in the mat 5 in order to allow the electrode 7 to pass therethrough. In this way, the electrode chamber 9 is formed by the space which is positioned between the inner wall surface of the case 4 and the outer circumferential surface of the catalyst carrier 3 and which has the side wall surface formed by the mat 5.

The electrode 7 has a connecting portion 7a and a shaft portion 7b. The connecting portion 7a is the portion which is connected to the catalyst carrier 3 and which is formed to extend along the side surface of the catalyst carrier 3. The shaft portion 7b has one end which is connected to the connecting portion 7a. Further, the shaft portion 7b passes through the through-hole 6a formed through the inner tube 6 and the through-hole 4d formed through the case 4, and the shaft portion 7b extends to the outside of the case 4. In other words, the electrode chamber 9 is formed around the shaft portion 7b. The electrode 7 may be constructed such that the connecting portion 7a and the shaft portion 7b are not directly connected to one another, but the connecting portion 7a and the forward end portion of the shaft portion 7b are connected to one another by means of a lead wire.

A support member 8, which supports the shaft portion 7b of the electrode 7, is provided in the through-hole 4d bored through the case 4. The support member 8 is formed of an electric insulator material, and the support member 8 is provided between the case 4 and the shaft portion 7b of the electrode 7 without any gap. The support member 8 protrudes to the inside of the electrode chamber 9 along the shaft portion 7b of the electrode 7. The support member 8 extends to the position at which the heat quantity of radiant heat and radiation heat of the catalyst carrier 3 can be received.

In this embodiment, the catalyst carrier 3 corresponds to the heat generating element according to the present invention. However, the heat generating element according to the present invention is not limited to the carrier for carrying the catalyst. For example, the heat generating element may be a structural member installed on the upstream side of the catalyst. In this embodiment, the case 4 corresponds to the case according to the present invention, and the mat 5 corresponds to the insulating member according to the present invention. Further, in this embodiment, the electrode 7 corresponds to the electrode according to the present invention, and the support member 8 corresponds to the support member according to the present invention.

[Function and Effect of Construction of EHC According to this Embodiment]

In FIG. 1, the arrows indicate the flows of the exhaust gas, the condensed water, and the water vapor produced by the evaporation of the condensed water. The exhaust gas, which flows through the exhaust tube 2, invades the mat 5 and the catalyst carrier 3. If the exhaust gas passes through the outer circumferential wall of the catalyst carrier 3 or the mat 5, and the exhaust gas invades the inside of the electrode chamber 9, then the moisture content (water content or water) contained in the exhaust gas is condensed, and thus the condensed water appears in the electrode chamber 9 in some cases.

If the condensed water appears in the exhaust tube 2, and the condensed water invades the mat 5 or the catalyst carrier 3, then the condensed water stays in the mat 5 or the catalyst carrier 3. If the amount of the condensed water allowed to stay in the mat 5 or the catalyst carrier 3 is increased, the condensed water invades the inside of the electrode chamber 9 in some cases. If the temperature of the exhaust gas is raised, then the condensed water, which stays in the mat 5 or the catalyst carrier 3, is evaporated, and the condensed water invades the inside of the electrode chamber 9 in a state of water vapor as well.

The electrode chamber 9 is the closed space surrounded by the inner wall surface of the case 4, the side surface of the catalyst carrier 3, and the mat 5. Therefore, the condensed water or the water vapor, which is produced in the electrode chamber 9 or which invades the inside of the electrode chamber 9, tends to stay in the electrode chamber 9.

In this context, if the support member 8 is provided in only the through-hole 4d of the case 4, and the support member 8 does not extend into the electrode chamber 9 (i.e., if the support member 8 does not protrude to the inside from the inner wall surface of the case 4), then the shaft portion 7b of the electrode 7 is exposed to the exhaust gas in the electrode chamber 9. In this situation, the shaft portion 7b of the electrode 7 tends to be covered with the condensed water. If the electrode chamber 9 and the electrode 7 included in the electrode chamber 9 are covered with the condensed water, it is feared that any short circuit may be formed between the electrode 7 and the case 4. If the short circuit is formed between the electrode 7 and the case 4, it is difficult to sufficiently raise the temperature of the catalyst carrier 3 by applying the electricity. As a result, it is difficult to sufficiently heat the exhaust gas purification catalyst 15. It is feared that the exhaust gas purification ability of EHC 1 may be consequently lowered.

In view of the above, in this embodiment, as described above, the support member 8 is allowed to protrude into the electrode chamber 9 along the shaft portion 7b of the electrode 7. Accordingly, the creeping distance, which is provided to effect the insulation between the shaft portion 7b of the electrode 7 and the case 4, can be more lengthened, as compared with such a case that the support member 8 is not allowed to protrude into the electrode chamber 9.

Figure 2:
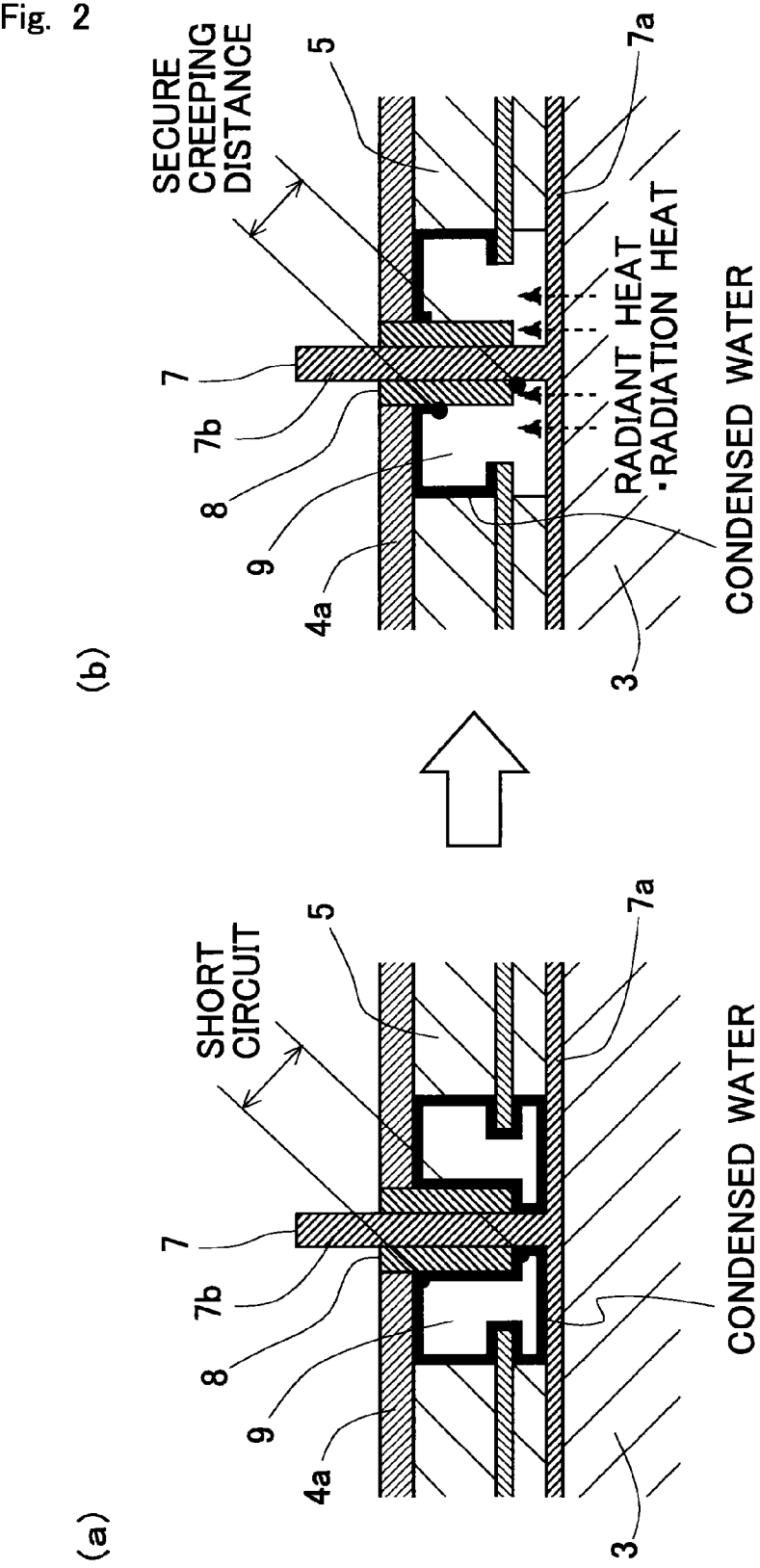
FIG. 2 shows enlarged views illustrating a portion at which an electrode chamber of EHC according to the first embodiment is formed, depicting the situation of condensed water in the electrode chamber.

FIG. 2 shows enlarged views illustrating the portion at which the electrode chamber of EHC according to this embodiment is formed, depicting the situation of the condensed water in the electrode chamber 9. In this embodiment, the support member 8 is exposed to the exhaust gas in the electrode chamber 9. Therefore, there is such a possibility that the support member 8 may be covered with the condensed water. As shown in FIG. 2(a), even in the case of the construction according to this embodiment, if the inner wall surface of the electrode chamber 9, the electrode 7, and the support member 8 are covered with the condensed water, it is feared that any short circuit may be formed between the electrode 7 and the case 4.

However, in this embodiment, the support member 8 extends to the position at which the heat quantity of radiant heat and radiation heat of the catalyst carrier 3 can be received. Therefore, the portion of the support member 8, which is positioned near to the catalyst carrier 3, tends to be heated by receiving the heat quantity of radiant heat and radiation heat of the catalyst carrier 3. Therefore, the condensed water, which covers the concerning portion of the support member 8, is easily evaporated. As shown in FIG. 2(b), when the condensed water, which covers the concerning portion of the support member 8, is evaporated, it is possible to secure the creeping distance in order to effect the insulation between the electrode 7 and the case 4. Therefore, according to this embodiment, any short circuit, which would be otherwise caused by the condensed water, can be suppressed between the electrode 7 and the case 4 in the electrode chamber 9.

In this embodiment, it is preferable that the support member 8 extends to a position disposed in the vicinity of the catalyst carrier 3 in order that the creeping distance, which is provided to effect the insulation between the electrode 7 and the case 4, is more lengthened, and the heat quantity of radiant heat and radiation heat of the catalyst carrier 3 can be received more easily. Further, the support member 8 may arrive at a portion of the shaft portion 7b at which the shaft portion 7b is connected to the connecting portion 7a.

Figure 3:
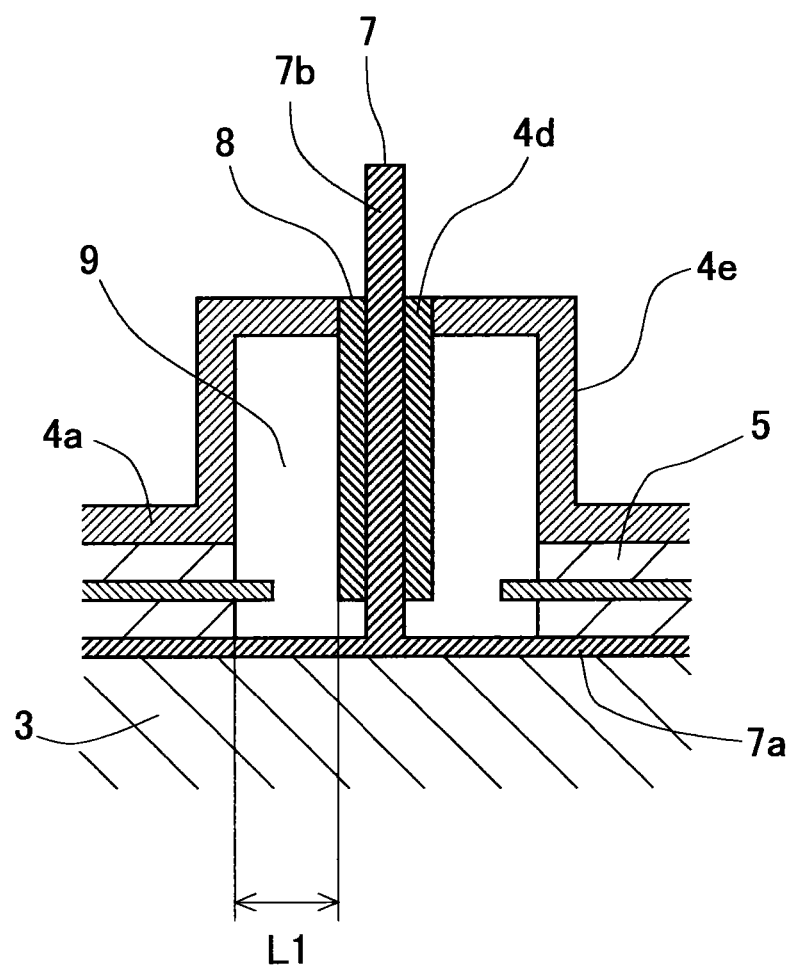
FIG. 3 shows an enlarged view illustrating a portion at which an electrode chamber of EHC according to a second embodiment is formed.

<Second Embodiment>
[Schematic Arrangement of EHC]
FIG. 3 shows an enlarged view illustrating a portion at which an electrode chamber of EHC according to this embodiment is formed. As shown in FIG. 3, in this embodiment, a portion 4e of the accommodating portion 4 of the case 4, which forms the wall surface of the electrode chamber 9 and at which the through-hole 4d for allowing the shaft portion 7b of the electrode 7 to pass therethrough is formed, is formed to have a protruding shape which protrudes outwardly as compared with any other portion of the accommodating portion 4a of the case 4 (this portion is hereinafter referred to as "protruding shape portion").

Also in this embodiment, the support member 8 extends from the through-hole 4d of the case 4 to the position at which the heat quantity of radiant heat and radiation heat of the catalyst carrier 3 can be received, in the same manner as the first embodiment. Further, the protruding shape portion 4e is formed so that the distance L1, which is provided between the support member 8 and the side wall surface at the inside of the protruding shape portion 4e, is such a distance that the occurrence of electric discharge is suppressed therebetween. The construction other than the above is the same as or equivalent to that of EHC according to the first embodiment.

[Function and Effect of Construction of EHC According to this Embodiment]
According to this embodiment, owing to the formation of the protruding shape portion 4e, the electrode chamber 9 is more widened or expanded to the outside. Further, the portion of the support member 8, which protrudes to the inside of the electrode chamber 9 along the shaft portion 7b of the electrode 7, is more lengthened as compared with such a case that the protruding shape portion 4e is not formed. As a result, it is possible to further lengthen the creeping distance in order to effect the insulation between the electrode 7 and the case 4. Therefore, any short circuit, which would be otherwise caused between the electrode 7 and the case 4 in the electrode chamber 9, can be suppressed at a higher probability.

The construction according to this embodiment is more effective when it is impossible to provide a sufficiently large spacing distance between the side surface of the catalyst carrier 3 and the inner wall surface of the accommodating portion 4a of EHC 4.

Figure 4:
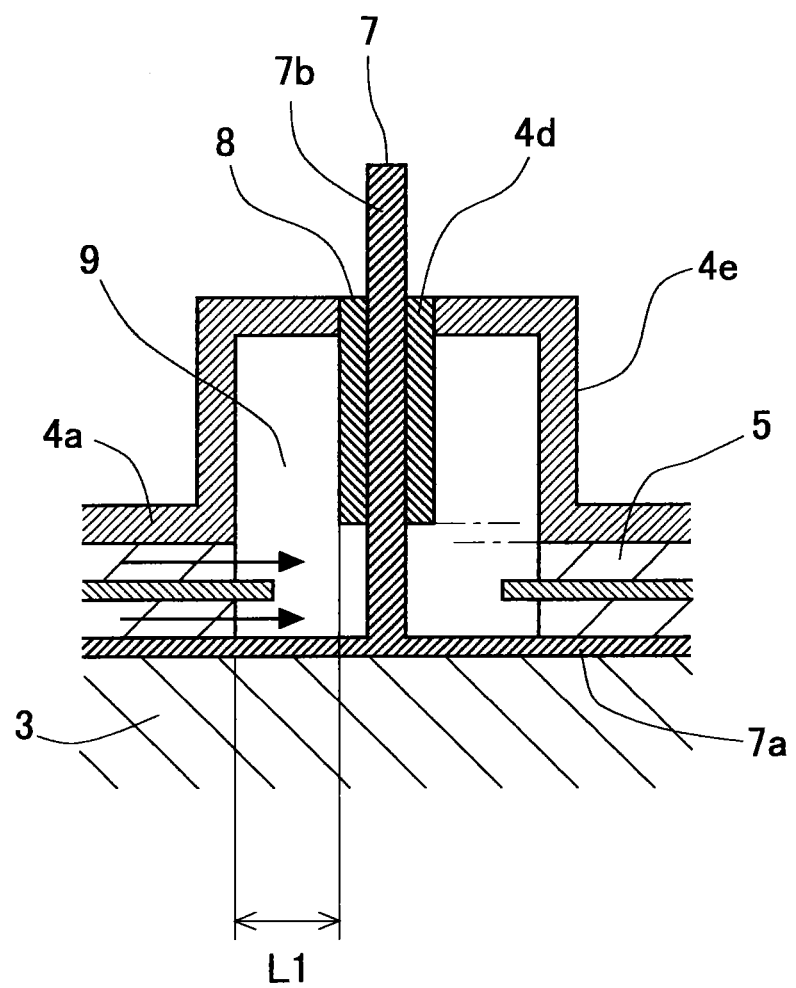
FIG. 4 shows an enlarged view illustrating a portion at which an electrode chamber of EHC according to a modified embodiment of the second embodiment is formed.

[Modified Embodiment]
FIG. 4 shows an enlarged view illustrating a portion at which an electrode chamber of EHC according to a modified embodiment of this embodiment is formed. As shown in FIG. 4, in this modified embodiment, a portion of the support member 8, which protrudes into the electrode chamber 9 along the electrode 7, has a forward end which is positioned outwardly as compared with an inner wall surface of the other portion of the accommodating portion 4a of the case 4 in the protruding shape portion 4e of the case 4.

According to the construction of the modified embodiment as described above, the support member 8 is hardly directly exposed to the flow of the exhaust gas which passes through the mat 5 and which invades the inside of the electrode chamber 9 (in FIG. 4, the arrows indicate the flow of the exhaust gas). Therefore, the production of the condensed water is suppressed, which would be otherwise caused such that the water content in the exhaust gas is cooled on the surface of the support member 8. As a result, the support member 8 is hardly covered with the condensed water. Therefore, any short circuit, which would be otherwise caused between the electrode 7 and the case 4 in the electrode chamber 9, can be suppressed at a higher probability.

Figure 5:
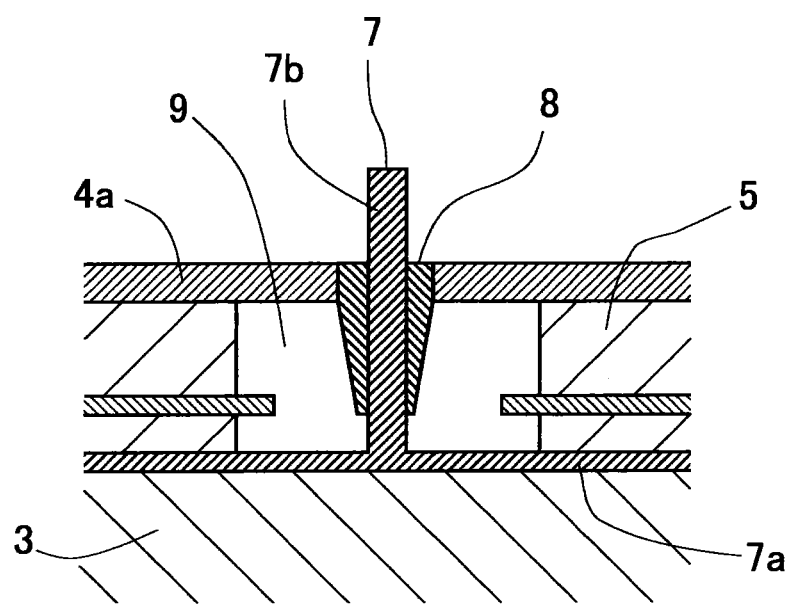
FIG. 5 shows an enlarged view illustrating a portion at which an electrode chamber of EHC according to a third embodiment is formed.

<Third Embodiment>
[Schematic Arrangement of EHC]
FIG. 5 shows an enlarged view illustrating a portion at which an electrode chamber of EHC according to this embodiment is formed. As shown in FIG. 5, in this embodiment, a portion of the support member 8, which protrudes into the electrode chamber 9, has such a tapered shape that cross-sectional areas, which are provided in a direction perpendicularly intersecting the axial direction of the shaft portion 7b of the electrode 7, are decreased at positions nearer to the forward end. In other words, the cross-sectional areas of the support member 8, which are provided in the direction perpendicularly intersecting the axial direction of the shaft portion 7b of the electrode 7, are more decreased at portions disposed nearer to the catalyst carrier 3 as compared with portions disposed nearer to the inner wall surface of the case 4. The construction other than the above is the same as or equivalent to that of EHC according to the first embodiment.

[Function and Effect of Construction of EHC According to this Embodiment]

According to this embodiment, the portion of the support member 8, which protrudes into the electrode chamber 9, has the heat capacity which is decreased at the portions disposed nearer to the catalyst carrier 3. Therefore, the portion of the support member 8, which is disposed near to the catalyst carrier 3, has the temperature which tends to be raised more easily by receiving the heat quantity of radiant heat and radiation heat of the catalyst carrier 3. As a result, the evaporation is more accelerated for the condensed water which covers the concerning portion of the support member 8. Therefore, any short circuit, which would be otherwise caused between the electrode 7 and the case 4 in the electrode chamber 9, can be suppressed at a higher probability.

<Modified Embodiment>

Figure 6:
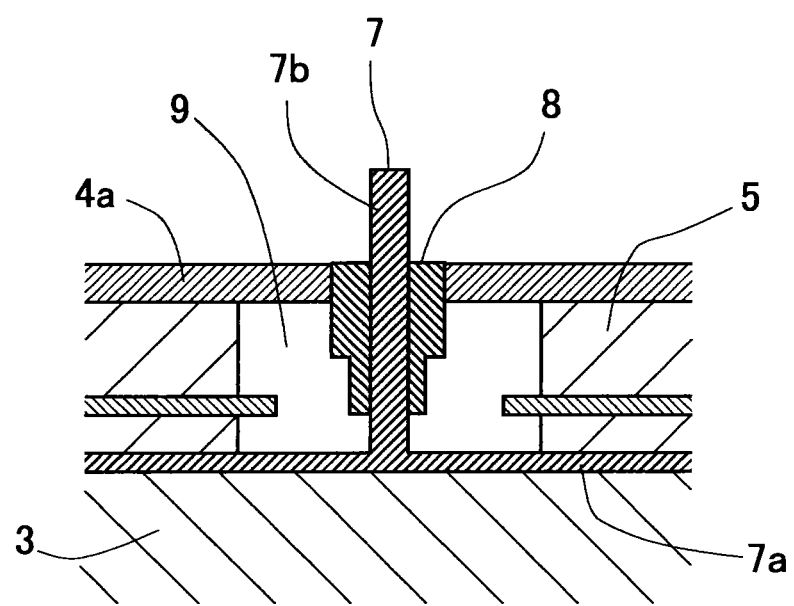
FIG. 6 shows an enlarged view illustrating a portion at which an electrode chamber of EHC according to a modified embodiment of the third embodiment is formed.

FIG. 6 shows an enlarged view illustrating a portion at which an electrode chamber of EHC according to a modified embodiment of this embodiment is formed. In this embodiment, it is not necessarily indispensable that the support member 8 has any tapered shape, provided that the cross-sectional areas of the support member 8, which are provided in the direction perpendicularly intersecting the axial direction of the shaft portion 7*b* of the electrode 7, are more decreased at a portion disposed nearer to the catalyst carrier 3 as compared with a portion disposed nearer to the inner wall surface of the case 4. For example, as shown in FIG. 6, the cross-sectional areas of the support member 8 may be changed in a stepwise manner. Even when the support member 8 is constructed as shown in FIG. 6, the heat capacity is decreased at the portion of the support member 8 disposed near to the catalyst carrier 3. Therefore, the effect, which is the same as or equivalent to that obtained as described above, can be obtained.

Even when the protruding shape portion is formed for the case 4 as in the second embodiment, the construction of the support member according to this embodiment can be applied.

PARTS LIST

1: electrically heated catalyst (EHC), 3: catalyst carrier, 4: case, 5: mat, 6: inner tube, 7: electrode, 8: support member, 9: electrode chamber.

The invention claimed is:

1. An electrically heated catalyst provided in an exhaust gas passage of an internal combustion engine, the electrically heated catalyst comprising:
a heat generating element which generates heat by applying electricity and which heats a catalyst by generating the heat;
a case which accommodates the heat generating element;
an insulating member which is provided between the heat generating element and the case, which supports the heat generating element, and which provides insulation from electricity;
an electrode which is connected to the heat generating element while passing through a through-hole formed through the case and an electrode chamber and which supplies electricity to the heat generating element, the electrode chamber being a space positioned between an inner wall surface of the case and an outer circumferential surface of the heat generating element and the electrode chamber having a wall surface formed by the insulating member; and
a support member which is formed of an electric insulator material, which supports the electrode by being provided between the case and the electrode without any gap in the through-hole formed through the case, and which is formed to protrude into the electrode chamber along the electrode, wherein:
a portion of the case, which forms a wall surface of the electrode chamber and at which the through-hole is formed, is formed to have a protruding shape which protrudes outwardly as compared with any other portion, and an inner wall surface of the protruding shape portion is separated from the support member
wherein a portion of the support member, which protrudes into the electrode chamber along the electrode, has a forward end which is positioned outwardly as compared with an inner wall surface of the other portion of the case in the portion of the case which is formed to have the protruding shape.

2. The electrically heated catalyst according to claim 1, wherein a space exists between the inner wall surface of the protruding shape portion and the support member.

3. An electrically heated catalyst provided in an exhaust gas passage of an internal combustion engine, the electrically heated catalyst comprising:
a heat generating element which generates heat by applying electricity and which heats a catalyst by generating the heat;
a case which accommodates the heat generating element;
an insulating member which is provided between the heat generating element and the case, which supports the heat generating element, and which provides insulation from electricity;
an electrode which is connected to the heat generating element while passing through a through-hole formed through the case and an electrode chamber and which supplies electricity to the heat generating element, the electrode chamber being a space positioned between an inner wall surface of the case and an outer circumferential surface of the heat generating element and the electrode chamber having a wall surface formed by the insulating member; and
a support member which is formed of an electric insulator material, which supports the electrode by being provided between the case and the electrode without any gap in the through-hole formed through the case, and which is formed to protrude into the electrode chamber along the electrode,
wherein a portion of the case, which forms a wall surface of the electrode chamber and at which the through-hole is formed, is formed to have a protruding shape which protrudes outwardly as compared with any other portion, and an inner wall surface of the protruding shape portion is separated from the support member, and
wherein a portion of the support member, which protrudes into the electrode chamber, has cross-sectional areas which are provided in a direction perpendicularly intersecting an axial direction of the electrode and which are more decreased at portions disposed nearer to the heat generating element as compared with portions disposed nearer to the inner wall surface of the case.

4. An electrically heated catalyst provided in an exhaust gas passage of an internal combustion engine, the electrically heated catalyst comprising:

a heat generating element which generates heat by applying electricity and which heats a catalyst by generating the heat;

a case which accommodates the heat generating element;

an insulating member which is provided between the heat generating element and the case, which supports the heat generating element, and which provides insulation from electricity;

an electrode which is connected to the heat generating element while passing through a through-hole formed through the case and an electrode chamber and which supplies electricity to the heat generating element, the electrode chamber being a space positioned between an inner wall surface of the case and an outer circumferential surface of the heat generating element and the electrode chamber having a wall surface formed by the insulating member; and a support member which is formed of an electric insulator material, which supports the electrode by being provided between the case and the electrode without any gap in the through-hole formed through the case, and which is formed to protrude into the electrode chamber along the electrode, wherein a portion of the case, which forms a wall surface of the electrode chamber and at which the through-hole is formed, is formed to have a protruding shape which protrudes outwardly as compared with any other portion, and a space exists between an inner wall surface of the protruding shape portion and the support member, and wherein a distance, which is provided between the inner wall surface of the protruding shape portion of the case and the support member, is more increased at a portion disposed nearer to the heat generating element as compared with a portion disposed nearer to the inner wall surface of the case.

* * * * *